(12) United States Patent
Lothian et al.

(10) Patent No.: US 9,747,949 B2
(45) Date of Patent: Aug. 29, 2017

(54) PROVIDING VIDEO TRANSITIONS

(71) Applicant: Google Inc., Mountain View, CA (US)

(72) Inventors: Ryan James Lothian, London (GB); Richard Zarek Cohen, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/616,191

(22) Filed: Feb. 6, 2015

(65) Prior Publication Data

US 2015/0228310 A1   Aug. 13, 2015

Related U.S. Application Data

(60) Provisional application No. 61/938,116, filed on Feb. 10, 2014.

(51) Int. Cl.
| | |
|---|---|
| *G11B 27/28* | (2006.01) |
| *G11B 27/10* | (2006.01) |
| *H04H 60/04* | (2008.01) |
| *H04H 60/06* | (2008.01) |

(52) U.S. Cl.
CPC .............. *G11B 27/28* (2013.01); *G11B 27/10* (2013.01); *H04H 60/04* (2013.01); *H04H 60/06* (2013.01)

(58) Field of Classification Search
None
See application file for complete search history.

(56) References Cited

U.S. PATENT DOCUMENTS

| | | | |
|---|---|---|---|
| 7,301,092 B1 | 11/2007 | McNally et al. | |
| 7,525,037 B2 | 4/2009 | Hansson et al. | |
| 8,319,086 B1 | 11/2012 | Iampietro | |
| 8,605,795 B2 | 12/2013 | Wang et al. | |
| 2005/0217462 A1 | 10/2005 | Thomson et al. | |
| 2009/0049979 A1 | 2/2009 | Naik et al. | |
| 2009/0150781 A1 | 6/2009 | Iampietro et al. | |
| 2009/0223352 A1 | 9/2009 | Matsuda et al. | |
| 2010/0080532 A1 | 4/2010 | Ubillos et al. | |
| 2010/0118033 A1 | 5/2010 | Faria | |

(Continued)

FOREIGN PATENT DOCUMENTS

| | | |
|---|---|---|
| EP | 2048803 A2 | 4/2009 |
| WO | 9422128 A1 | 9/1994 |
| WO | 2014001607 | 1/2014 |

OTHER PUBLICATIONS

European Patent Office; International Search Report and Written Opinion related PCT/US2015/014918; dated May 12, 2015; 10 pages.

(Continued)

*Primary Examiner* — Eileen Adams
(74) *Attorney, Agent, or Firm* — IP Spring

(57) ABSTRACT

Implementations generally relate to providing video transitions. In some implementations, a method includes receiving a soundtrack. The method further includes determining one or more sound characteristics of the soundtrack. The method further includes determining at least one target portion of the soundtrack based on the one or more sound characteristics. The method further includes receiving one or more video clips. The method further includes adjusting a length of one or more of the video clips based on one or more adjusting policies. The method further includes combining the one or more video clips with the soundtrack.

20 Claims, 9 Drawing Sheets

(56) References Cited

U.S. PATENT DOCUMENTS

| | | | | |
|---|---|---|---|---|
| 2010/0281375 A1* | 11/2010 | Pendergast | ............ | G11B 27/034 |
| | | | | 715/723 |
| 2012/0086855 A1* | 4/2012 | Xu | ......................... | G06T 13/205 |
| | | | | 348/515 |
| 2012/0210231 A1* | 8/2012 | Ubillos | .................. | G11B 27/34 |
| | | | | 715/723 |
| 2013/0290843 A1 | 10/2013 | Lehtiniemi et al. | | |
| 2014/0096002 A1* | 4/2014 | Dey | ...................... | G06F 3/0488 |
| | | | | 715/723 |
| 2014/0366710 A1 | 12/2014 | Eronen | | |

OTHER PUBLICATIONS

International Bureau of WIPO, International Preliminary Report on Patentability for International Patent Application No. PCT/US2015/014918, Aug. 16, 2016, 7 pages.

European Patent Office, International Search Report and Written Opinion for International Patent Application No. PCT/US2014/069377, Mar. 25, 2015, 9 pages.

International Bureau of WIPO, International Preliminary Report on Patentability for International Patent Application No. PCT/US2014/069377, Jun. 14, 2016, 6 pages.

USPTO, First Action Interview, Pre-Interview Communication for U.S. Appl. No. 14/565,035, Oct. 3, 2016, 5 pages.

USPTO, First Action Interview Office Action for U.S. Appl. No. 14/565,035, Feb. 21, 2017, 7 pages.

\* cited by examiner

The highest scoring of these is kept, and the others are discarded

600

PROVIDING VIDEO TRANSITIONS

CROSS REFERENCE TO RELATED APPLICATIONS

This application claims priority from U.S. Provisional Patent Application No. 61/938,116 entitled "PROVIDING VIDEO TRANSITIONS," filed Feb. 10, 2014, which is hereby incorporated by reference as if set forth in full in this application for all purposes.

BACKGROUND

Social network systems often enable users to upload media content such as photos, videos, music, etc. Social network systems also enable users to share various media content such as videos with each other. Some systems enable users to play music tracks along with videos. For example, while a video is playing, music can be played in the background.

SUMMARY

Implementations generally relate to providing video transitions. In some implementations, a method includes receiving a soundtrack. The method further includes determining one or more sound characteristics of the soundtrack. The method further includes determining at least one target portion of the soundtrack based on the one or more sound characteristics. The method further includes receiving video clips. The method further includes adjusting a length of one or more of the video clips based on one or more adjusting policies. The method further includes combining the video clips with the soundtrack.

With further regard to the method, in some implementations, the one or more sound characteristics include one or more of volume, speed, and dynamics. In some implementations, the one or more sound characteristics include one or more beat characteristics. In some implementations, the determining of the at least one target portion of the soundtrack based on one or more changes in the one or more sound characteristics. In some implementations, the adjusting of the lengths of the one or more of the video clips includes trimming video content from one or more of the video clips. In some implementations, the adjusting of the lengths of the one or more of the video clips includes adding video content to the end one or more of the video clips. In some implementations, the adjusting policy includes placing at least one video clip transition on a first beat of the target portion of the soundtrack.

In some implementations, a non-transitory computer-readable storage medium carries program instructions thereon, where the instructions when executed by one or more processors cause the one or more processors to perform operations including: receiving a soundtrack; determining one or more sound characteristics of the soundtrack; determining at least one target portion of the soundtrack based on the one or more sound characteristics; receiving video clips; adjusting a length of one or more of the video clips based on one or more adjusting policies; and combining the video clips with the soundtrack.

With further regard to the computer-readable storage medium, in some implementations, the one or more sound characteristics include one or more of volume, speed, and dynamics. In some implementations, the one or more sound characteristics include one or more beat characteristics. In some implementations, the determining of the at least one target portion of the soundtrack based on one or more changes in the one or more sound characteristics. In some implementations, the adjusting of the lengths of the one or more of the video clips includes trimming video content from one or more of the video clips. In some implementations, the adjusting of the lengths of the one or more of the video clips includes adding video content to the end one or more of the video clips. In some implementations, the adjusting policy includes placing at least one video clip transition on a first beat of the target portion of the soundtrack.

In some implementations, a system includes one or more processors, and logic encoded in one or more tangible media for execution by the one or more processors. When executed, the logic is operable to perform operations including: receiving a soundtrack; determining one or more sound characteristics of the soundtrack; determining at least one target portion of the soundtrack based on the one or more sound characteristics; receiving video clips; adjusting a length of one or more of the video clips based on one or more adjusting policies; and combining the video clips with the soundtrack.

With further regard to the system, in some implementations, the one or more sound characteristics include one or more of volume, speed, and dynamics. In some implementations, the one or more sound characteristics include one or more beat characteristics. In some implementations, the determining of the at least one target portion of the soundtrack is based on one or more changes in the one or more sound characteristics. In some implementations, the adjusting of the lengths of the one or more of the video clips includes trimming video content from one or more of the video clips. In some implementations, the adjusting of the lengths of the one or more of the video clips includes adding video content to the end one or more of the video clips.

DETAILED DESCRIPTION

Implementations generally relate to providing video transitions. In various implementations, a system receives a soundtrack. The system then determines sound characteristics of the soundtrack. The sound characteristics may include volume, speed, and dynamics, for example. The system then determines at least one target portion of the soundtrack based on the sound characteristics. In some implementations, the target portions are different from one or more other portions of the soundtrack by a predetermined difference threshold. In some implementations, the predetermined difference threshold may be based on sound characteristics. The system then receives video clips. The system then adjusts a length of one or more of the video clips based on one or more adjusting policies. The system then combines the video clips with the soundtrack.

Figure 1:
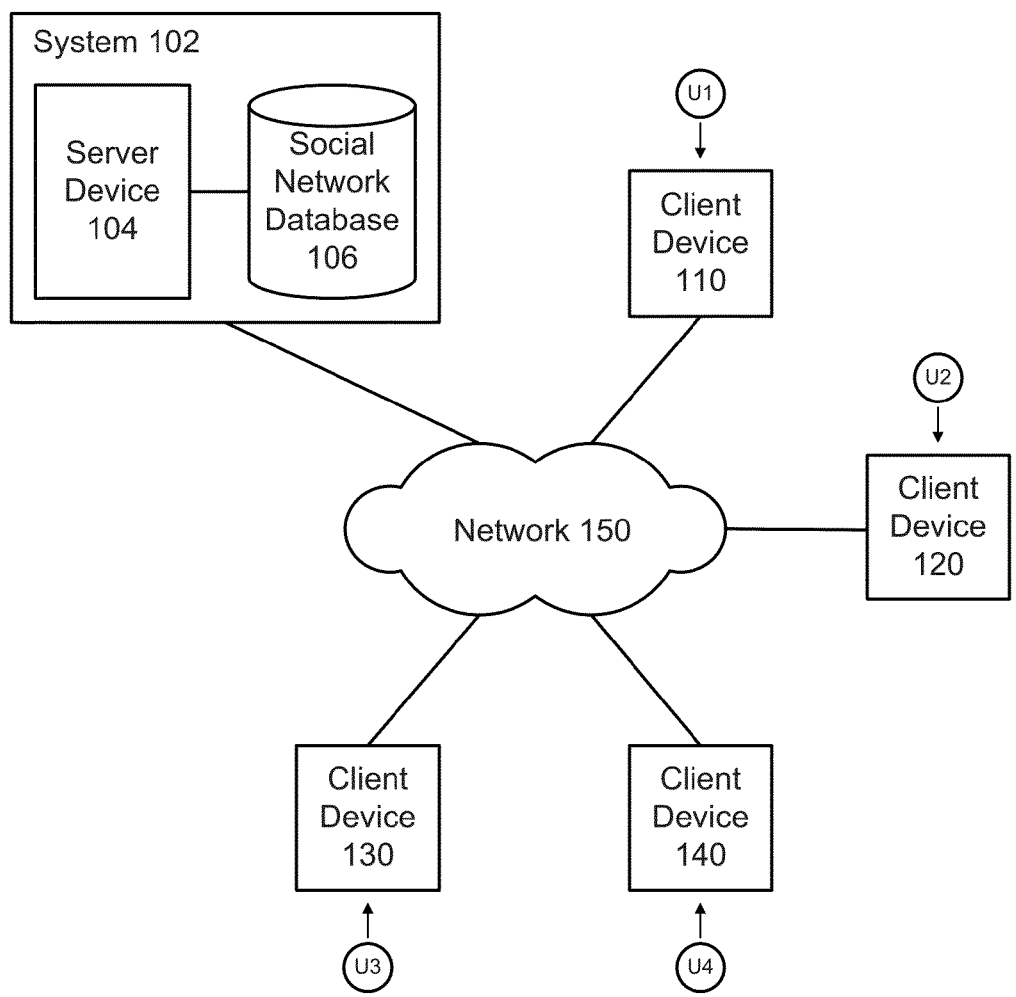
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may use respective client devices 110, 120, 130, and 140 to upload videos to system 102, view videos/movies, and share videos with each other.

In the various implementations described herein, the processor of system 102 causes the elements described herein (e.g., movies/videos and accompanying soundtracks, etc.) to be played in a user interface on one or more user devices.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc. Implementations may be implemented in a mobile application, in hardware and/or software, or as a server-side service.

Figure 2:
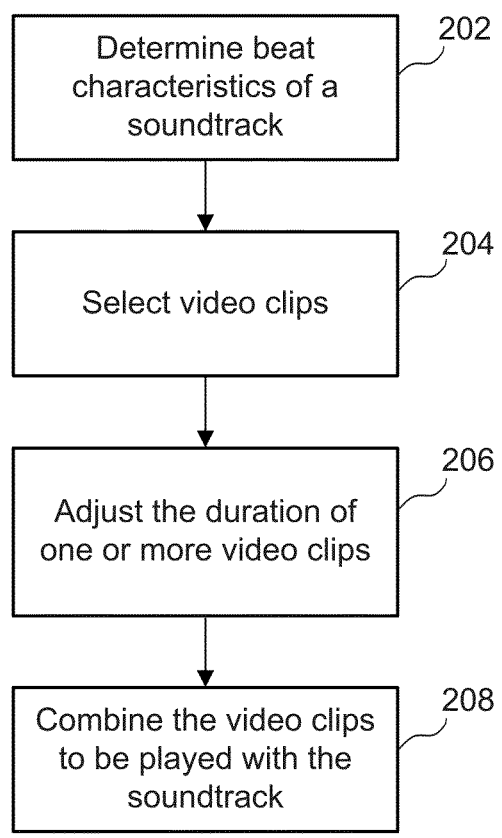
FIG. 2 illustrates an example simplified flow diagram for providing video transitions, according to some implementations.

FIG. 2 illustrates an example simplified flow diagram for providing video transitions, according to some implementations. Referring to both FIGS. 1 and 2, a method is initiated in block 202, where system 102 determines beat characteristics of at least one soundtrack. For example, in various implementations, beat characteristics may include which beats are first beats of target portions of the soundtrack. As described in more detail below, in various implementations, a target portion of a sound track is a particular portion of the soundtrack that system 102 aligns with one or more video clips. There may be one or more target portions in a soundtrack, depending on the particular implementation. As described in more detail below, a target portion is different from one or more other portions of the soundtrack by a predetermined difference threshold.

In various implementations, the predetermined difference threshold is an amount of difference between a given target portion of the soundtrack and another portion of the soundtrack. For example, in some implementations, a target portion may be a chorus of a song, or a bridge of a song, etc., where one target portion is substantially different from other portions of the song. In various implementations, the predetermined difference threshold may be based on one or more sound characteristics. In particular, in some implementations, the predetermined difference threshold may be a predetermined difference in each of one or more of the sound characteristics, where sound characteristics may include one or more of volume, speed, dynamics, etc.

In some implementations, system 102 may analyze a given soundtrack for varying sound characteristics. System 102 may then determine/identify one or more particular target portions of the soundtrack based on the sound characteristics. For example, system 102 may detect a difference in volume, speed, and/or dynamics in a particular portion of the soundtrack. If the difference for any one or more sound characteristics meets one or more predetermined difference thresholds, system 102 may deem that particular portion of the soundtrack to be different from the previous and/or subsequent portions of the soundtrack. In some implementations, system 102 may analyze metadata associated with the soundtrack to determine particular target portions.

The particular sound characteristics may vary and will depend on the particular portions of a music piece. For example, other sound characteristics may include voicing, types of instruments sounds, number of instrument sounds, movements, etc. In other examples, sound characteristics may include one or more of melodies, keys, modes, etc.

In some implementations, beat characteristics may include which beats are first beats of music bars. A music bar may also be referred to as a bar or measure. In some implementations, beat characteristics may include beat times (e.g., beats per minute, etc.). In some implementations, beat characteristics may include a time signature (e.g., 4/4 time, 2/4 time, 3/4 time, etc.).

Figure 3:
FIG. 3 illustrates an example beat matcher, according to some implementations.

FIG. 3 illustrates an example beat matcher 300 of system 102, according to some implementations. In various implementations, beat matcher 300 may be implemented at least in part by a beat matching algorithm. Example implementations of a beat matching algorithm are described in more detail below.

In various implementations, a soundtrack and clip length constraints are inputted into beat matcher 300. As shown, beat matcher 300 of system 102 outputs clip lengths for each video.

In some implementations, system 102 stores a list of soundtracks. System 102 may automatically select a soundtrack, suggest a soundtrack for user selection, or receive a user preference or selection of a soundtrack. In some implementations, system 102 may enable the user to select a soundtrack from a library of soundtracks, or provide a soundtrack to system 102. In some implementations, system 102 enables the user to select a music preference (e.g., style of music). As such, system 102 may select or suggest a particular soundtrack based on the style of music.

In some implementations, beat matcher 300 of system 102 determines beat characteristics of the beats of the soundtrack. In some implementations, the beat characteristics (e.g., beats, rhythm, beat times, bar times, time signature, etc.) for the soundtrack are an input to system 102.

In various implementations, the sound characteristics may be determined from the soundtrack by performing signal processing techniques (e.g., to determine the volume, speed, pitch, dynamics, beats, rhythm, beat times, etc.). For example, the sound signals of the soundtrack stored in a file on the system or a client device may be processed by analyzing the signal energy in the time and/or frequency domain in order to identify the beats and beat times of the soundtrack. In some implementations, system 102 may analyze the soundtrack to cull the beat characteristics, which are stored for further processing together with the soundtrack in the system or the client device. The beat characteristics need not be computed by the system 102, yet system 102 can compute one or more beat characteristics if needed. The beat characteristics may be produced by separate system(s), or otherwise annotated by human interaction. In some implementations, the soundtrack includes a list of timestamps of beats. In some implementations, the units of the timestamps are in microseconds. The actual units may depend on the particular implementation.

In some implementations, as a part of determining beat characteristics, beat matcher 300 determines which beats are first beats of target portions of the soundtrack. For example, in various implementations, system 102 may analyze the sounds of the soundtrack to determine the dominant beats, where the dominant beats represent the first beats of measures. In some implementations, system 102 may analyze metadata associated with the soundtrack to determine first beats of measures.

In some implementations, as a part of determining beat characteristics, beat matcher 300 determines each beat of the soundtrack that is the first beat of a music bar (e.g., first beat of a measure), and beat matcher 300 specifically marks those beats. Beat matcher 300 also determines each beat of the soundtrack that falls on a half bar (e.g., the third beat of a bar with a 4/4 time signature).

As indicated above, beat characteristics may include beat information. For example, a given soundtrack may be played a particular speed (e.g., 60 beats per minutes) and in a particular time signature (e.g., 4/4 time signature). In this example, the first beat at 1 second results in beat times: 1,000,000 us, 2,000,000 us, and 3,000,000 us). Also, the first beats of bars are at 1,000,000 us, 5,000,000 us, and 9,000,000 us.

In various implementations, video clip length constraints are also inputted into beat matcher 300. Such video clip length constraints may include default video clip lengths, minimum video clip lengths, and maximum video clip lengths for each video clip. Also, such video clip constraints may be in microseconds, or any other units, depending on the particular implementation. Example implementations of video clip length constraints are described in more detail below.

Figure 4:
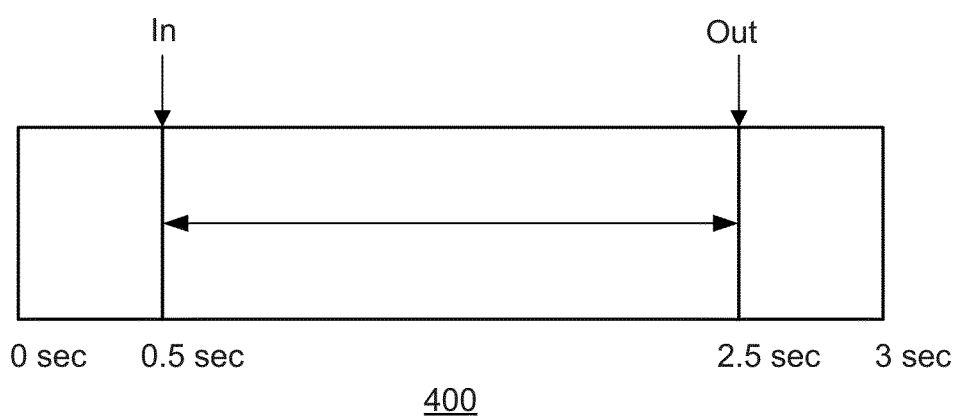
FIG. 4 illustrates an example timing diagram, according to some implementations.

FIG. 4 illustrates an example timing diagram 400, according to some implementations. In various implementations, system 102 determines one or more lengths, which may be referred to as video clip length constraints. Such video clip length constraints may include minimum and maximum lengths for video clips. In various implementations, a minimum video clip length may be predetermined length (e.g., 5 seconds, 10 seconds, 30 seconds, etc.), depending on the particular implementation. Similarly, in various implementations, a maximum video clip length may be predetermined length (e.g., 20 seconds, 30 seconds, 60 seconds, etc.), depending on the particular implementation. In various implementations, the minimum length is typically shorter than the maximum length. In some implementations, the maximum is the length of a particular soundtrack. In some implementations, the maximum is the length of a target portion of a particular soundtrack.

For example, referring to FIG. 4, if there is a 2 second video clip that is taken from the exact middle of a 3 second video, $Length_{default}$ would then be 2. In some implementations, system 102 adjusts video clips by moving the endpoint. As such, the video clip can extend to a maximum of 0.5 seconds. In this example, $Length_{maximum}$ is 2.5. In some scenarios, due to hardware restrictions on video playback, the phone hardware might not play back video clips of less than a particular length (e.g., 1 second). As such, $Length_{minimum}$ is 1. Accordingly, in various implementations, each video clip has a minimum length (e.g., 1 second, in the example), a default length (e.g., 2 seconds), and a maximum length (e.g., 2.5 seconds).

Referring again to FIG. 2, in block 204, system 102 selects video clips based on one or more selection criteria. In some implementations, system 102 stores a list of video clips taken from larger videos and soundtracks. System 102 may automatically select such videos, suggest videos, and receive user preferences or selections of video clips.

In various implementations, system 102 selects candidate video clips for playback with the soundtrack by searching all of the video the user has taken during the course of a day. As indicated above, system 102 may select video clips based on one or more selection criteria. For example, such criteria may include video clips from the most colorful videos, the sharpest videos, videos containing the best facial expressions, etc.

In some implementations, system 102 may select video clips from videos taken during a predetermined time period (e.g., during the day, during the past 2 days, past week, etc.).

In some implementations, system 102 may enable the user to provide one or more video clips, or to swap one or more of the system-selected or system-suggested video clips with one or more user-selected video clips, or to add or remove one or more video clips.

In some implementations, the selection criteria may include one or more length considerations of each of the video clips. For example, in various implementations, selection criteria may include system 102 selecting video clips that are shorter in length than the soundtrack. In various implementations, selection criteria may include system 102 selecting video clips that are shorter in length than one or more target portions of the soundtrack. In various implementations, system 102 may select video clips that meet the video clip length constraints describe above.

In block 206, system 102 adjusts the duration or length of one or more of the video clips based on one or more beat matching policies. In some implementations, system 102 first determines the length of each of the video clips. System 102 then applies one or more beat matching policies to determine how much to adjust each video clip, if at all.

In various implementations, system 102 adjusts the length of the video clips with one or more aesthetic goals or policies. These goals or policies may be achieved by system 102 analyzing the soundtrack, extracting beat characteristics from the soundtrack by sound processing the soundtrack. For example, using the various implementations described herein, a beat matching policy may be to maximize the number of video clip transitions that occur on a target beat.

In some implementations, the target beat may be the first beat of one of the target portions of the soundtrack. In some implementations, the target beat may be a first beat of a music bar. As described in more detail below, in various implementations, the target beat is a beat that system 102 aligns with the beginning or end of a video clip.

In various implementations, a beat matching policy may be to maximize the number of video clips that end on a target beat (e.g., on the first beat of a music bar, etc.). For example, if a video clip ends on a first beat of music bar, the subsequent video clip begins on the first beat of the music bar. As such, in various implementations, a beat matching policy may be to maximize the number of video clips that begin on a target beat (e.g., on the first beat of a music bar, etc.).

In some implementations, a video clip beginning and/or ending on a half-bar is optional, even if not as desired as beginning and/or ending on a bar. If a video clip ends on a half-bar, the subsequent video clip begins on the half-bar. In various implementations, a beat matching policy may be to enable some video clip transitions to occur on a half-bar.

In some implementations, a beat matching policy may be to maximize the number of video clips that are substantially equal their original lengths. In other words, the beat matching policy may be to maximize the number of video clips that are equal to or as close as possible to their original lengths. Or, in other words, the beat matching policy may be to minimize how much each video clip length is modified (e.g., trimmed or extended), so as to not modify lengths of the input footage more than is necessary. For example, if there are 3 video clips that are 3 seconds long, video clips are preferred that may be roughly in the 3 second range after beat matching, e.g., 2-4 second range, rather than much longer or much shorter.

In some implementations, a beat matching policy may be to minimize the difference between a total length of the adjusted video clips and a total length of the video clips at their original lengths. In some implementations, a beat matching policy may be to keep the total length of the adjusted video clips to be played as close as possible to the original total length. In other words, a beat matching policy may be to minimize the change in the total length of all video clips. As a result, the total length is more or less the same as it was before performing the beat matching. In some scenarios, a user may request a particular movie length to produce (e.g., 40 seconds, etc.). System 102 may enable the user to flip through soundtracks to select what they like. System 102 adjusts the lengths of one or more of the videos by either shortening a video clip or adding more material to end of the clip (from original video).

In some implementations, system 102 may include static images or photos to include with the combination of video clips. System 102 may, for example, show a given image for a particular length of time (e.g., 2.5 seconds, 3 seconds, etc.).

In some implementations, the adjusting of the length of each of the one or more video clips to be played is based on a scoring function. For example, the beat matching algorithm of system 102 uses the scoring function to quantify how well a given assignment of video clip lengths meet one or more aesthetic goals or policies.

System 102 evaluates which combination of video clips is best with respect to beat matching for the particular soundtrack. In various implementations described herein, a candidate combination of video clips may also be referred to a configuration. In some implementations, the beat matching algorithm gives a certain number of points for each video clip that begins and/or ends on the first beat of a bar. The scoring function results in video clips that begin and/or end on bar boundaries (e.g., first beat of a bar) more often than with conventional algorithms. This is because the dynamic programming algorithm gets better results than the (non-optimal) greedy algorithms.

In various implementations, the beat matching algorithm includes a scoring function, which includes a score penalty based on how much the total length of the movie varies from the original length. As a result, the total length of the movie varies less than with conventional algorithms.

In some implementations, the following expression may be used to determine the score for lengths associated with a particular combination of video clips.

$$\text{Score} = A * b + B * b_{1/2} - C * \sum_{per\ clip} \frac{\text{Length}_{new} - \text{Length}_{default}}{\text{Length}_{max} - \text{Length}_{min}} - D * \text{Total Length}_{new} - \text{Total Length}_{default}$$

The variable b is the number of video clips that end on a bar (e.g., ends on the first beat of a bar). The variable b ½ is the number of video clips that end on a half-bar (e.g., the third beat in a 4/4 time signature).

The second term of the equation that includes the C constant represents a penalty for how different each video clip is from its original length. For each video clip, the beat matching algorithm takes different between the video clip length before beat matching $\text{Length}_{default}$ and the video clip length after beat matching $\text{Length}_{new}$, and then divides the difference by the ranges working in (e.g., $\text{Length}_{max} - \text{Length}_{min}$).

The third/final term of the equation that includes the D constant represents a penalty for the how much the total length of the video has changes from its original total length (e.g., Total $\text{Length}_{new}$–Total $\text{Length}_{default}$).

A, B, C, D are configurable constants, which may be used to adjust the priorities (weights) of the beat matching algorithms (e.g., A=3, B=1, C=1, D=1).

In various implementations, the beat matching algorithm finds an assignment of video clip lengths that maximize this score. It progresses through the video clips in order.

The score is a resulting score for a particular combination or configuration of lengths for a combination of clips. The beat matching algorithm selects the configuration with the highest score, which will result in a configuration with the most video clips that begin and/or end on a bar.

Figure 5:
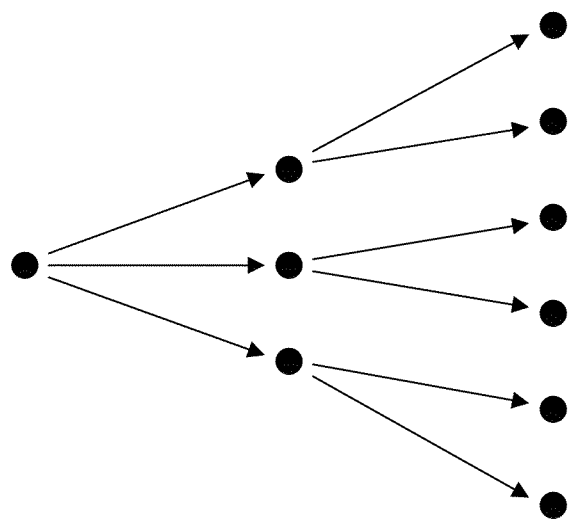
FIG. 5 illustrates an example video clip selection tree, according to some implementations.

FIG. 5 illustrates an example video clip selection tree 500, according to some implementations. As shown, at each level in the tree (progressing from the left side to the right side), the beat matching algorithm considers several lengths such that the size of the tree grows exponentially with the number of video clips. For example, in the initial state there is one video clip. Moving to the right, there may be 3 length choices for the video clip. Continuing to the right, the number of length choices of 2 video clips increases exponentially. Continuing further, for 15 video clips, there will be $3^{15} \approx 14$ million possible configurations. Examining all possible configurations would be computationally infeasible. As described in more detail below, the beat matching algorithm of system 102 selects a configuration efficiently.

In various implementations, system 102 uses a dynamic programming algorithm to choose the lengths of the clips. In various implementations, the dynamic programming algorithm breaks problems down into simpler subproblems and performs each subproblem only once, thus reducing or minimizing the number of computations. In various implementations, beat matching happens in less than 100 ms. In another example, a two-minute movie would take less than 0.5 seconds to beat match. So it is not a noticeable delay for the user.

In some implementations, system 102 may use a useful property of the scoring function to reduce the amount of work needed. In some implementations, the following expression may be used to determine an optimal configuration.

$Score_{1 \ldots n}$=f ($score_{1 \ldots n-1}$, total length of 1 ... n−1, length choice at n)

Figure 6:
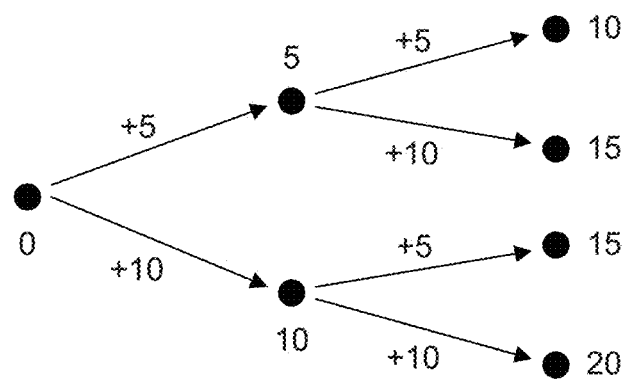
FIG. 6 illustrates an example video clip selection tree, according to some implementations.

FIG. 6 illustrates an example video clip selection tree 600, according to some implementations. In various implementations, the highest scoring of these is kept; the other discarded. As shown, the number at each node is a total number of seconds. The number at each line is a number of seconds that is added to get a new number of seconds at the next node (e.g., looking at the top numbers: 0+5=5; 5+5=10). For example, if there are 10 ways of making a total length of 30 seconds using clips 1, . . . , n−1, system 102 can discard 9 of these and only continue investigating the most highly scoring configuration. This "optimal substructure" allows system 102 to apply dynamic programming to the problem.

In some implementations, system 102 may also cull the partial solutions on each iteration of the algorithm, keeping only the 100 most promising configurations. This improves performance, even if it may result in the beat matching algorithm not finding the best configuration.

In some implementations, system 102 can also cull solutions that are very close together. For example, if there are partial solutions of 15.0, 15.1, and 15.2 seconds total length, then unless the 15.1 solution is the best of the three, system 102 can discard it. This helps the algorithm pursue a more diverse range of potential solutions.

In some implementations, system 102 may use a dynamic program algorithm in combination with culling of partial solutions to provide good performance while still finding a near-optimal solution. In some implementations, system 102 may cull partial solutions in other ways to improve performance or avoid culling a good solution early.

Referring again to FIG. 2, in block 208, system 102 combines the video clips to be played with at least one soundtrack in a movie. In various implementations, the movie includes the selected video clips (possibly combined with static images), and plays such visual content in conjunction with the soundtrack. As described above, the videos (and possibly static images) change on bar changes of the soundtrack (e.g., on the first beat of a particular target portion of the soundtrack). This provides a more aesthetically pleasing experience watching the movie. In some implementations, system 102 may notify the user that system 102 has made a movie for the user.

Implementations described herein provide various benefits. For example, implementations described herein provide aesthetically pleasing videos that meet various criteria, since the beat characteristics of a soundtrack to be played in conjunction with the selected video clips are used to apply the beat matching algorithm to the combination and duration adjustment of the one or more video clips selected. Implementations also provide beat matching at high speeds by applying dynamic programming and dynamic programming in combination with culling of partial solutions of the scoring function.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

Figure 7:
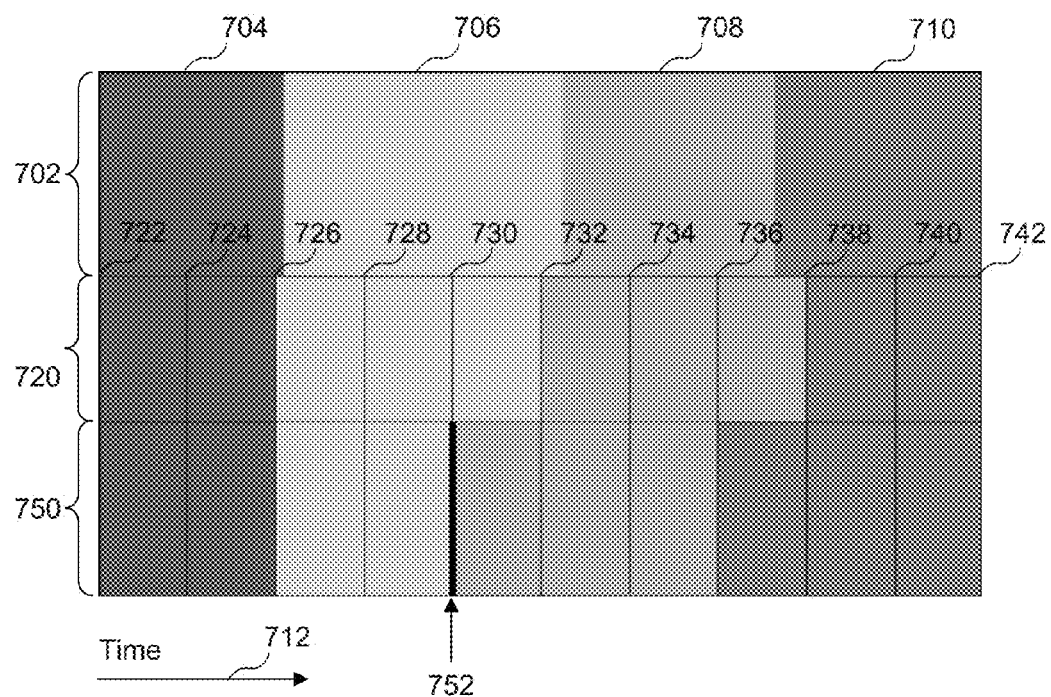
FIG. 7 illustrates an example timing diagram, which may be used to implement the implementations described herein.

FIG. 7 illustrates an example timing diagram 700, which may be used to implement the implementations described herein. Timing diagram 700 shows a row 702 of video clips 704, 706, 708, and 710 that constitute a movie. Row 702 shows the original transition of video clips 704, 706, 708, and 710.

A timeline 712 indicates the passage of time from the beginning of a soundtrack that accompanies the video clips to the end of the soundtrack. As shown, video clip 704 is played first at the beginning of the soundtrack, video clip 706 is played next, video clip 708 is played next, and video clip 710 is played last, at the end of the soundtrack.

As shown in row 702, the transition times from one video clip to the next are not matched to the soundtrack. For example, the transition times may be based on the original lengths of the video clips.

Timing diagram 700 also shows a row 720 of video clips 704, 706, 708, and 710, where the lengths of these video clips are modified based in part on a beat matching policy to maximize the number of video clips transitions that occur on a target beat. In this particular example, the target beat is the first beat of a measure.

Rows 702, 720, and 750 show different implementations of video clips 704, 706, 708, and 710, where different beat matching policies are applied. Row 750 is described in more detail below. Rows 702, 720, and 750 are shown adjacent to each other for ease of illustration in order to show how different beat matching policies result in different transition times.

For ease of illustration, each of video clips 704, 706, 708, and 710 is shown in the same shade (in the different example implementations of rows 702, 720, and 750) in order to visually indicate changes in their lengths (from one row to another row). For example, video clip 704 is shown with a dark shading in all rows 702, 720, and 750. Video clip 706 is shown with a light shading in all rows 702, 720, and 750. Video clip 708 is shown with a light-medium shading in all rows 702, 720, and 750. Video clip 710 is shown with a medium-dark shading in all rows 702, 720, and 750. The particular shades are merely illustrative, with sufficient differences to indicate different video clips, or transitions from one video clip to another video clip moving from left to right along the time line 712.

Referring to row 720, timing diagram 700 also includes music bar lines 722, 724, 726, 728, 730, 732, 734, 736, 738, 740, and 742. Each music bar line 722-740 indicates the first beat of a measure. Music bar line 742 indicates the end of the last beat of the previous measure. In various implementations, the first beat of a given measure falls on a music bar line.

The following description compares the transitions in row 702 to those in row 720. Referring to row 702, video clip 704 begins on music bar line 722 and ends a little after music bar line 726. Video clip 706 begins a little after music bar line 726 and ends a little after music bar line 732. Video clip 708 begins a little after music bar line 732 and ends between music bar lines 736 and 738. Video clip 710 begins between music bar lines 736 and 738 and ends at music bar line 742.

Referring to row 720, video clip 704 begins on music bar line 722 and ends on music bar line 726. Video clip 706 begins on music bar line 726 and ends on music bar line 732. Video clip 708 begins on music bar line 732 and ends on music bar line 738. Video clip 710 begins on music bar line 738 and ends on music bar line 742.

As indicated above, timing diagram 700 also shows row 750 of video clips 704, 706, 708, and 710, where the lengths of these video clips are modified based in part on a beat matching policy to maximize the number of video clips transitions that occur on a target beat. In various implementations, the target beat may be the first beat of a measure and/or may be the first beat of a target portion of the soundtrack.

Timing diagram 700 also shows a row 750 of modified transition times based in part on a beat matching policy to maximize the number of video clips transitions that occur on a target beat. In various implementations, the target beat may be one the first beat of a measure or may be the first beat of a target portion of the soundtrack. In various implementations, where the target beat may be defined in multiple ways (e.g., first beat of a measure, the first beat of a target portion of the soundtrack, etc.), system 102 may apply the different definitions of target beat. For example, referring to row 750, video clip 704 begins on music bar line 722 and ends on music bar line 726. Video clip 706 begins on music bar line 726 and ends on music bar line 730. Video clip 708 begins on music bar line 730 and ends on music bar line 736. Video clip 710 begins on music bar line 738 and ends on music bar line 742. In this particular implementation, one target beat falls on the first beat of a measure (music bar line 730), which also happens to be the first beat of a target portion of the soundtrack.

In various implementations, system 102 may apply a priority scheme to beat matching policies. For example, referring to row 750, music bar 730 is the first beat of a measure and also the first beat 752 of a target portion of the soundtrack. In this example, system 102 causes the movie to transition from video clip 706 to video clip 708 at music bar line 730 (in row 750) instead of at music bar line 732 (as in row 720). As such, in some implementations, system 102 may prioritize a target beat that is the first beat 752 of a target portion of the soundtrack over a target beat that is a first beat of a measure.

In this particular example, as indicated above, the first beat 752 of a target portion of the measure happens to fall on the first beat of the measure (music bar line 730). In various scenarios, the first beat of a target portion of the soundtrack need not fall on the first beat of the measure. For example, the first beat of a target portion of the soundtrack may fall on a half-bar or in anywhere else in a given measure. In such a scenario, system 102 may position a transition on a half-bar or where ever the first beat of the target portion is positioned.

Figure 8:
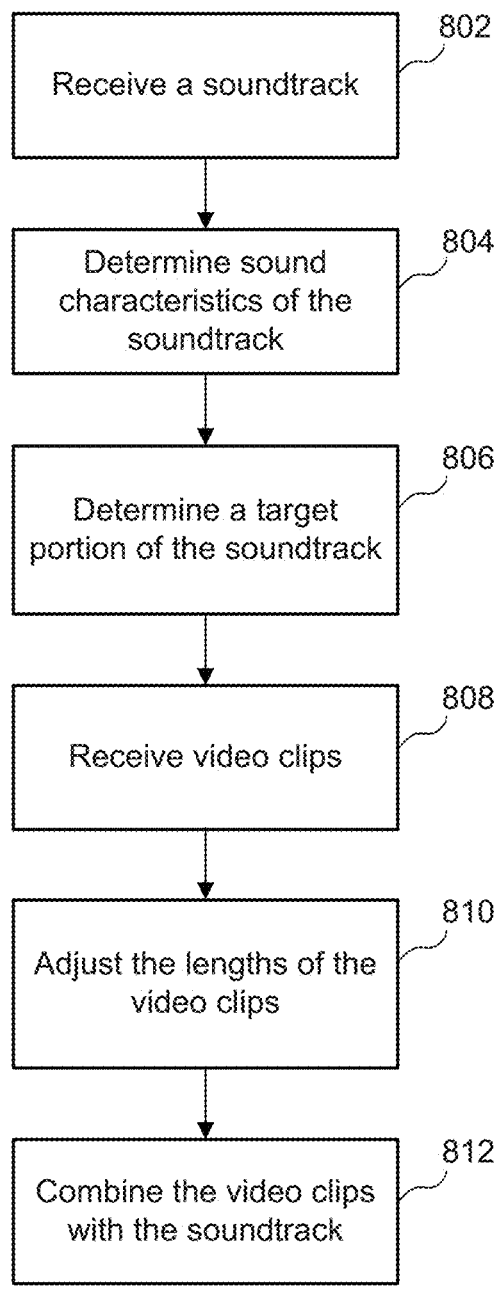
FIG. 8 illustrates an example simplified flow diagram for providing video transitions, according to some implementations.

FIG. 8 illustrates an example simplified flow diagram for providing video transitions, according to some implementations. Referring to both FIGS. 1 and 8, a method is initiated in block 802, where system 102 receives a soundtrack. In some implementations, system 102 may receive the soundtrack from any suitable source of soundtracks. In some implementations, system 102 may receive soundtrack from a user.

In block 804, system 102 determines one or more sound characteristics of the soundtrack. As indicated above, sound characteristics may include one or more of volume, speed, dynamics, pitch, etc. In various implementations, sound characteristics may include beat characteristics. For example, sound characteristics may include beats, rhythm, beat times, time signature, etc. In another example implementation, in some implementations, the sound characteristics may include beat characteristics such as which beats are first beats of the target portion.

Such sound characteristics vary from one portion of the soundtrack to another. For example, one portion of the soundtrack may be a chorus of a song, where the volume, speed, and/or dynamics change relative to the previous portion. System 102 may utilize any suitable sound analysis algorithm to detect, identify, and measure each sound characteristic. The particular sound characteristics may vary and will depend on the particular portions of the particular sound track. For example, other sound characteristics may include voicing, types of instruments sounds, number of instrument sounds, movements, etc. In other implementations, sound characteristics may include one or more of melodies, keys, modes, etc.

In block 806, system 102 determines one or more target portions of the soundtrack based on the one or more sound characteristics. In various implementations, system 102 analyzes a given soundtrack for varying sound characteristics. In various implementations, system 102 determines one or more target portions of a soundtrack based on one or more changes in the sound characteristics. For example, in some implementations, system 102 detects differences and/or changes in the sound characteristics (e.g., volume, speed, dynamics, etc.) during the soundtrack. System 102 then determines or identifies one or more particular target portions of the soundtrack based on the change in one or more of the sound characteristics.

If a particular difference or change for any one or more sound characteristics meets one or more predetermined difference thresholds, system 102 may deem that particular portion of the soundtrack to be different from the previous and/or subsequent portions of the soundtrack. In some implementations, system 102 may also analyze metadata associated with the soundtrack to determine particular target portions. For example, the soundtrack may include metadata that indicates an introduction portion, a verse portion, a chorus portion, a bridge portion, etc.

In block 808, system 102 receives one or more video clips. In some implementations, system 102 may receive the video clips from any suitable source of video clips. In some implementations, system 102 may receive video clips from a user.

In block 810, system 102 adjusts the length of one or more of the video clips based on one or more adjusting policies. For example, in various implementations, system 102 adjusts the lengths of the one or more of the video clips by trimming video content from one or more of the video clips. For example, system 102 may trim a portion of the beginning of a video clip. System 102 may also trim a portion of the middle of the video clip. System 102 may also trim a portion of the end of the video clip. In some implementations, system 102 may trim one or more portions at the beginning, middle, and/or end of a given video clip.

In some implementations, system 102 adjusts the lengths of the one or more of the video clips by adding video content to the end one of or more of the video clips. For example, the video content may come from an original video, where the video clip being added to is a portion of the original video clip. In some implementations, system 102 may add video content to the beginning, middle, and/or end of a given video clip.

In some implementations, system 102 may adjust the lengths of one or more of the video clips by slowing down one or more of the video clips. In some implementations, system 102 may adjust the lengths of one or more of the video clips by either speeding up one or more of the video clips The speed of the video clip may be altered by a sufficiently small amount so as to be unnoticeable to a user.

As indicated above, system 102 adjusts the length of one or more of the video clips based on one or more adjusting policies. In various implementations, the one or more adjusting policies include one or more beat matching policies described herein. For example, in some implementations, an adjusting policy may include placing at least one video clip transition on a first beat of the target portion of the soundtrack.

In block 812, system 102 combines the one or more video clips with the soundtrack. In various implementations, the combination of the video clips and the soundtrack provides a movie to the user. In various implementations, the movie includes the selected video clips (possibly combined with static images), and plays such visual content in conjunction with the soundtrack. As described above, the videos (and possibly static images) change on bar changes of the soundtrack (e.g., on the first beat of a particular target portion of the soundtrack). This provides a more aesthetically pleasing experience watching the movie. In some implementations, system 102 may notify the user that system 102 has made a movie for the user.

As indicated above, in various implementations, a target portion of a sound track is a particular portion of the soundtrack that system 102 aligns with one or more video clips. There may be one or more target portions in a soundtrack, depending on the particular implementation. As described in more detail below, a target portion is different from one or more other portions of the soundtrack by a predetermined difference threshold.

As indicated above, in various implementations, the predetermined difference threshold is an amount of difference between a given target portion of the soundtrack and another portion of the soundtrack. For example, in some implementations, a target portion may be chorus of a song, or bridge of a song, etc., where one target portion is substantially different from other portions of the song. In various implementations, the predetermined difference threshold may be based on one or more sound characteristics. In particular, in some implementations, the predetermined difference threshold may be a predetermined difference in each of one or more of the sound characteristics.

Figure 9:
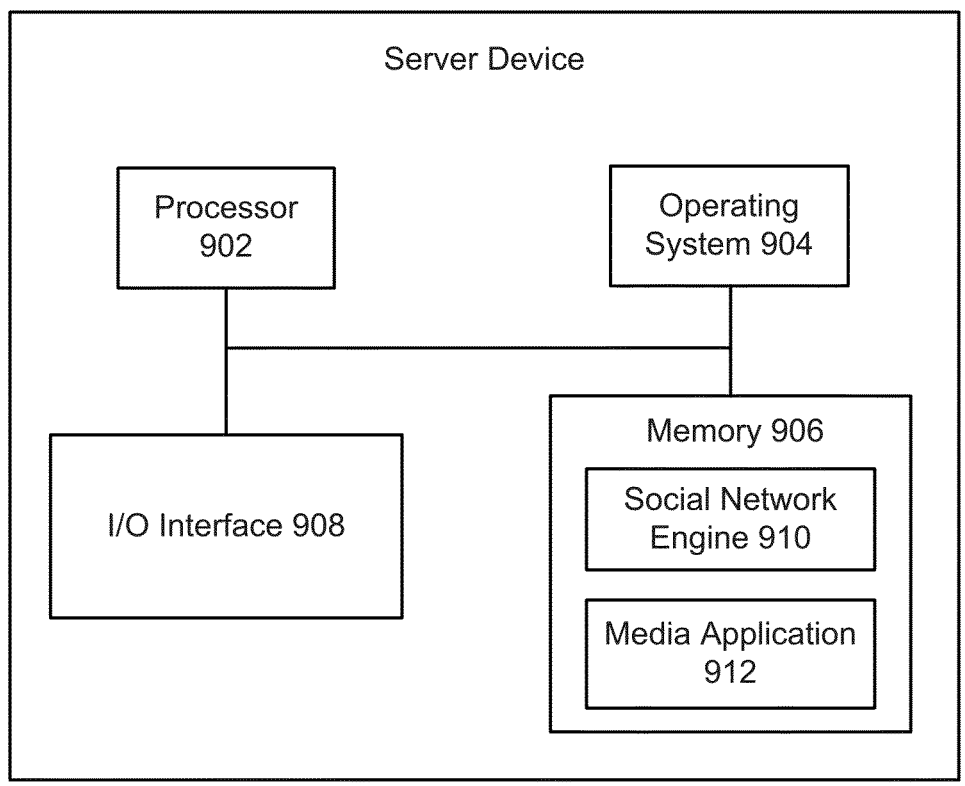
FIG. 9 illustrates a block diagram of an example server device, which may be used to implement the implementations described herein.

FIG. 9 illustrates a block diagram of an example server device 900, which may be used to implement the implementations described herein. For example, server device 900 may be used to implement server device 104 of FIG. 1, as well as to perform the method implementations described herein. In some implementations, server device 900 includes a processor 902, an operating system 904, a memory 906, and an input/output (I/O) interface 908. Server device 900 also includes a social network engine 910 and a media application 912, which may be stored in memory 906 or on any other suitable storage location or computer-readable medium. Media application 912 provides instructions that enable processor 902 to perform the functions described herein and other functions.

For ease of illustration, FIG. 9 shows one block for each of processor 902, operating system 904, memory 906, I/O interface 908, social network engine 910, and media application 912. These blocks 902, 904, 906, 908, 910, and 912 may represent multiple processors, operating systems, memories, I/O interfaces, social network engines, and media applications. In other implementations, server device 900 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:
1. A computer-implemented method comprising:
receiving a soundtrack;
determining one or more sound characteristics of the soundtrack;
determining at least one target portion of the soundtrack based on the one or more sound characteristics including a target beat that represents a first beat of a measure;
receiving a set of video clips;
selecting candidate video clips for playback from the set of video clips based on selection criteria, wherein the selection criteria include a type of facial expression and a length of each video clip in the set of video clips;
adjusting a length of one or more of the candidate video clips based on one or more adjusting policies including maximizing a number of transitions between the can- didate video clips that occur on the target beat, wherein the target beat represents the first beat of the measure; and combining the candidate video clips with the soundtrack.

2. The method of claim 1, wherein the one or more sound characteristics include one or more of volume, speed, and dynamics.

3. The method of claim 1, wherein the one or more sound characteristics include one or more beat characteristics.

4. The method of claim 1, wherein determining the at least one target portion of the soundtrack is further based on one or more changes in the one or more sound characteristics.

5. The method of claim 1, wherein adjusting the length of the one or more of the candidate video clips further includes trimming video content from the one or more of the candidate video clips or adding video content to an end of the one or more of the candidate video clips.

6. The method of claim 1, wherein adjusting the length of the one or more of the candidate video clips further includes slowing down the one or more of the candidate video clips or speeding up the one or more of the candidate video clips.

7. The method of claim 1, further comprising selecting the set of video clips based on a capture time of each video in the set of video clips falling within a predetermined time period.

8. A non-transitory computer-readable storage medium carrying program instructions thereon, the program instructions when executed by one or more processors cause the one or more processors to perform operations comprising:

receiving a soundtrack;

determining one or more sound characteristics of the soundtrack including a target beat that represents a first beat of a measure;

determining at least one target portion of the soundtrack based on the one or more sound characteristics;

receiving video clips that were selected based on each of the video clips being recorded during a specific time period;

adjusting a length of one or more of the video clips based on adjusting policies including adding video content to an end of the one or more of the video clips and maximizing a number of video clip transitions that occur on the target beat, wherein the target beat represents the first beat of the measure; and combining the video clips with the soundtrack.

9. The computer-readable storage medium of claim 8, wherein the one or more sound characteristics include one or more of volume, speed, and dynamics.

10. The computer-readable storage medium of claim 8, wherein the one or more sound characteristics include one or more beat characteristics.

11. The computer-readable storage medium of claim 8, wherein determining the at least one target portion of the soundtrack is further based on one or more changes in the one or more sound characteristics.

12. The computer-readable storage medium of claim 8, wherein adjusting the length of the one or more of the video clips further includes one or more of trimming video content from the one or more of the video clips, slowing down the one or more of the video clips, and speeding up the one or more of the video clips.

13. The computer-readable storage medium of claim 8, wherein:

the video clips include a plurality of video clips; and combining the video clips with the soundtrack includes arranging a first video clip of the plurality of video clips that ends on a half-bar adjacent to a second video clip of the plurality of video clips that begins on the half-bar.

14. The computer-readable storage medium of claim 8, wherein the sound characteristics further include at least one of voicing, a type of instrument sound, a number of instrument sounds, and a number of movements.

15. A system comprising:

one or more processors; and logic encoded in one or more tangible media for execution by the one or more processors and when executed operable to perform operations comprising:

receiving a soundtrack;

determining one or more sound characteristics of the soundtrack including a target beat that represents a first beat of a measure;

determining at least one target portion of the soundtrack based on the one or more sound characteristics;

receiving video clips that were selected based on each of the video clips being recorded during a specific time period;

adjusting a length of one or more of the video clips based on adjusting policies including adding video content to an end of the one or more of the video clips and maximizing a number of video clip transitions that occur on the target beat, wherein the target beat represents the first beat of the measure; and combining the video clips with the soundtrack.

16. The system of claim 15, wherein the one or more sound characteristics include one or more of volume, speed, and dynamics.

17. The system of claim 15, wherein the one or more sound characteristics include one or more beat characteristics.

18. The system of claim 15, wherein determining of the at least one target portion of the soundtrack is further based on one or more changes in the one or more sound characteristics.

19. The system of claim 15, wherein adjusting the length of the one or more of the video clips further includes at least one of trimming video content from the one or more of the video clips, slowing down the one or more of the video clips, and speeding up the one or more of the video clips.

20. The system of claim 15, wherein the operations further comprise selecting video clips that were recorded during at least one of: a course of a day, past two days, and a past week.

* * * * *